US007173529B2

(12) United States Patent
Przygoda, Jr.

(10) Patent No.: US 7,173,529 B2
(45) Date of Patent: *Feb. 6, 2007

(54) EVENT DRIVEN INFORMATION SYSTEM

(75) Inventor: Chester T. Przygoda, Jr., Troy, MI (US)

(73) Assignee: USM Systems, Ltd., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/341,769

(22) Filed: Jan. 27, 2006

(65) Prior Publication Data

US 2006/0187030 A1    Aug. 24, 2006

Related U.S. Application Data

(63) Continuation of application No. 10/766,203, filed on Jan. 28, 2004, now Pat. No. 7,026,937, which is a continuation of application No. 10/091,858, filed on Mar. 5, 2002, now Pat. No. 6,717,517, which is a continuation-in-part of application No. 09/558,751, filed on Apr. 21, 2000, now Pat. No. 6,373,389.

(51) Int. Cl.
*G08B 13/14* (2006.01)
(52) U.S. Cl. .............................. 340/572.4; 340/539.13; 340/691.1; 340/691.6; 340/692; 340/825.49
(58) Field of Classification Search ............. 340/572.1, 340/572.4, 573.1, 539.1, 539.13, 691.1, 692, 340/825.49
See application file for complete search history.

(56) References Cited

U.S. PATENT DOCUMENTS

| 4,471,345 | A | * | 9/1984 | Barrett, Jr. ................ 340/572.1 |
| 4,688,244 | A | * | 8/1987 | Hannon et al. ............. 235/385 |
| 4,750,197 | A | * | 6/1988 | Denekamp et al. ......... 235/385 |
| 5,708,423 | A | * | 1/1998 | Ghaffari et al. .......... 340/572.4 |
| 5,942,977 | A | * | 8/1999 | Palmer et al. ........... 340/572.5 |
| 6,496,806 | B1 | * | 12/2002 | Horwitz et al. ............ 340/10.1 |
| 6,600,418 | B2 | * | 7/2003 | Francis et al. ........... 340/572.1 |

* cited by examiner

*Primary Examiner*—Thomas Mullen
(74) *Attorney, Agent, or Firm*—Howard & Howard Attorneys, P.C.

(57) ABSTRACT

A system for tracking and monitoring at least one item in an environment includes at least one transmitter assigned a unique identification number for the item and attached to the item and at least one receiver for receiving a first data packet which includes the unique identification number from the transmitter. At least one node computer controls the receiver, receives a second data packet which includes said unique identification number and direction-of-travel code from the receiver, and determines a location of the item from the direction-of-travel code. A controller computer controls the node computer, receives the unique identification number and the location of the item from the node computer, and stores the unique identification number and the location of the item. A central computer facility coordinates the controller computer and collects and stores the unique identification number and the location of the item for exportation from the system.

13 Claims, 6 Drawing Sheets

EVENT DRIVEN INFORMATION SYSTEM

This application is a continuation of U.S. patent application Ser. No. 10/766,203, filed Jan. 28, 2004 now U.S. Pat. No. 7,026,937, which is a continuation of U.S. patent application Ser. No. 10/091,858 filed Mar. 5, 2002, now U.S. Pat. No. 6,717,517, which is a continuation-in-part of U.S. patent application Ser. No. 09/558,751 filed on Apr. 21, 2000, now U.S. Pat. No. 6,373,389.

FIELD OF THE INVENTION

The invention relates generally to an area specific event-driven information system and method used to monitor and track the location of items and relational events within a defined environment. Based on the movement and relation of the items in the environment, the invention performs user-specified actions to provide warnings and/or advice of authorized user defined proximities or to locate the items in the environment through the use of peripheral warning or communication devices.

BACKGROUND

Computer systems and technology employing electromagnetic frequencies, such as radio frequencies, to track the location of an object in an environment are generally known in the art. Many systems track items through area detection tracking. Area detection tracking commonly uses a single computer linked to radio frequency receivers placed periodically throughout a facility. The receivers attempt to locate tag transmitters placed on objects in the facility. The receivers employ a single antenna with a predetermined bandwidth. The larger the bandwidth the larger the potential tracking area to be covered but also the greater amount of energy required to operate the system. When the tag transmitter enters the bandwidth of a receiver, the receiver receives an identification code transmitted by the tag and relays the code to the computer. The computer then records the location of the object bearing the tag transmitter based on the location of the receiver in the facility that relayed the identification code.

Area detection tracking possesses many shortcomings. First, the systems typically provide insufficient coverage to track items to an acceptable resolution. Typically, area detection systems place receivers at stations or sites where objects are expected to be, such as the next station in a manufacturing process. The area detection system in those cases is merely a location verification system. The system reports that an item has arrived at its designated station, has arrived late, or at the incorrect station. However, the system has no ability to locate an item in a facility that has deviated from its designed course. Additionally, location verification systems are easy to intentionally avoid. Because receivers are only placed in particular locations with only a predetermined transmission receiving field, a deviant individual with knowledge of the system or receiver technology could remove items from the facility without detection.

Area detection tracking systems also do not provide any information on the direction in which an item bearing a transmitter has moved once it leaves the area-detection field of a receiver. These systems use point-to-point-tracking schemes. These schemes track the history of the movement of an object as it passes within the radio frequency fields of each receiver but cannot determine the direction of movement of an item. In such cases, the area detection systems provide information on the last recorded location of an object but provide no information on the object's current location until the object passes within the radio frequency field of another receiver. In large facilities, such as manufacturing plants, office buildings, warehouses and hospitals, many paths of movement could branch from each area detection point making it difficult, if not impossible, to know the current location of an item when the item is not within the radio frequency area of a receiver.

In an attempt to overcome the shortcomings attributable to area detection systems, arrays of receivers are distributed in a grid pattern with the size of an detection area determined by the predetermined spacing of receivers based on the width of its radio frequency field. In a grid area detection scheme, radio frequency coverage of facility is increased closing the space between receivers thereby providing increased data collection and higher resolution for point-to-point tracking—the more receivers, the closer together, the greater the ability to plot the movement of the object throughout the facility.

Grid area detection systems carry serious disadvantages. First, grid systems are typically only used in smaller facilities with open floor plans such in manufacturing facilities for semiconductors, high-priced electronics or medical equipment. The grid area detection systems require many receivers in close proximity that make the capital and installation of such a system cost prohibitive in large facilities or in facilities with many corridors, rooms, multiple floors, and numerous points of ingress and egress. Second, grid detection systems are expensive to operate in terms of energy costs to run the numerous receivers. To minimize the operational costs of continuously running all receivers and transmitters, motion detection devices and circuits are employed in the facility to activate receivers only when objects are in motion in close proximity. However, the addition of motion detection technology to the system complicates operation of the detection efforts and adds additional installation and capital costs as well as complexities to the programming required to operate the system.

To overcome the disadvantages of the area detection methods, more complex tracking systems such as time-of-arrival and signal-strength methods have been developed to pinpoint and continuously track the location of an object within a facility. In such programs, receivers are placed strategically throughout a facility. As an object moves through a facility, the exact location of an object is determined by a time-of-arrival determination based on the amount of time it takes multiple receivers to receive a transmission from an item tagged with a transmitter. Based on the timing receipt of the signal from the multiple receivers, the computer can determine the location of items by correlating the time differential of signal receipt as a distance of the object from each receiver. Likewise, a signal-strength method determines the location of an object from the strength of its transmission received by multiple receivers. Here, signal-strength directly correlates with the distance of the object from the receiver, with the transmission signal being stronger the closer it is to a receiver.

The time-of-arrival and signal-strength methods also have disadvantages. Although these systems can determine the exact location of an object, they can only do so if the transmission from an object falls within the radio frequency area of at least three receivers. Accordingly, many receivers must be placed throughout a facility to provide sufficient coverage. Additionally, the tag transmitter assigned to an object often must transmit through walls, machinery and other obstructions that may absorb the transmission from the transmitter of the object introducing unpredictable levels of attenuation of signal strength or time delay in the receivers' receipt of the signal. Obstructions may also deflect or reflect the signal of the transmitter projecting a false or ghost signal that does not correspond with the true location of the object. The time-of-arrival and signal-strength methods of tracking also involve complex transmitter and receiver circuitry and computer algorithms to determine the location of an item from the signal receipt by multiple receivers adding to the cost of the system and operational complexities. Because of these constraints, such systems typically are employed in small manufacturing facilities and offices where valuable items are often transported throughout the facility requiring continuous and detailed information on the items whereabouts.

Prior art radio frequency locating systems use single-frequency technology in locating systems. A limited number of other radio frequency locating systems use spread-spectrum radio communications in the high megahertz frequency ranges. Operation in the high frequency ranges is required to provide a larger bandwidth to increase the area of detection and the strength of the detection field over the area. Because of operation at these high frequencies, Federal Communications Commission licensing may be required to operate the system. Other systems may be operated in ranges not requiring licensing but may interfere with other systems in the facility such as telecommunication systems, computers, and equipment sensitive to the radio frequencies. Additionally, other systems in the facility may also emit radio frequencies in close proximity to the signal of the transmitter introducing noise that will project false locations or interfere with the calculations performed by the system to determine the location of an item.

Some low frequency detection systems are also known in the art. In these systems, transmitters operating in low frequency ranges transmit identification information from low range transmitters to receivers to log the location of a person or object. These systems because of the inaccuracy and stability of low-frequency transmissions require close proximity transmissions between the transmitter and the receiver. This transmission range is nominally two feet or less. Such systems may require passing or waving the transmitter next to or near the receiver or even a more active component of swiping the transmitter through a component linked to the receiver such as magnetic card reader or a scanning device. The close proximity required to record a transmission from the identification transmitter makes such systems unreliable to passively locate and monitor items in a facility.

Moreover, prior art radio frequency location systems are often ineffective in tracking the location of individuals in a facility. Individuals in a facility often find the continuous tracking of their location as invasive and will attempt to evade continuous monitoring of their location by avoiding receivers when and where possible. Intentional avoidance of receivers by individuals makes tracking the individuals as well as other objects that they may be transporting difficult and at times inaccurate.

Finally, prior art radio frequency location systems provide the limited role of documenting movement of an item or verifying its location in a facility. In some cases, the continuous monitoring of an item may be reviewed and evaluated to track down the last known location of an object or to determine that an item has deviated from its expected course in the facility. In such cases, reactive measures can be taken by personnel in the facility to either locate the object or attempt to learn why the item deviated from its expected path. However, prior art systems do not provide real-time responses to the movement of items in a facility to attempt to stop or curb the unauthorized movement of an item by communicating warnings to alert the mover of the item of the unauthorized activity, alerting security, and enabling users of the system to proactively locate an item in the facility. Prior art systems do not provide immediate response and action to the unauthorized movement or activity associated with an item. In the same course, known area detection systems are not coupled with third party communication and response devices in a facility to permit the system to utilize systems already present in the facility to aid in the location of an item or to immediately respond to unauthorized activities.

SUMMARY OF THE INVENTION

Large facilities, like hospitals, manufacturing plants, engineering facilities and the like cover large areas over multiple floors. Each of these facilities have items (inanimate objects as well as people) that need to be tracked. Items such as files, tools, and equipment are often missing, misplaced or even stolen. Items such as personnel, workers, patients and visitors become lost, wander into an unauthorized area, or leave a facility without others knowledge of these events. Much too often people commit unauthorized acts moving and misplacing equipment or removing an item from an environment altogether for their own personal gain or use. The cost associated with replacing stock or missing equipment and the time lost searching for misplaced items in a large facility can be enormous.

The instant invention is directed to an area-specific tracking and event-driven response system for tracking and monitoring items in a facility environment and providing actions in the environment in response to the current location or movement of an item. The system operates by assigning a configurable identification device, such as a badge or tag, embodied with a transmitter designed to emit a unique identification number assigned to each item. The identification device attaches to or is worn by each item to be tracked in the environment. The transmitter in each identification device operates through the use of near field radio frequencies that accurately sends the transmitted data through a transmission range of up to two meters from the transmitter without interfering with the operation of other electronic equipment in the environment or degrading the transmission because of the presence of other electronic equipment emitting similar radio frequencies.

The environment in which the system operates is divided into domains that correspond to discrete and sectional areas of the facility such as separate floors or departments. All items in a domain are tracked by a controller computer that manages the system functionalities in the domain. Each domain is further subdivided into zones. Zones typically encompass individual rooms, halls, closets, and other areas in a domain defined by a portal, a point of ingress or egress such as a doorway, elevator, escalator, or stairs, between zones in the domain or between domains themselves. A node computer assigned to track items in a zone connects to the controller computer for the domain that contains the zone.

A node computer connects to a receiver supported by a first and second antennas configuration generating adjacent and overlapping first and second receiving regions for receiving signals emitted from near field inductive or low frequency electromagnetic fields generated by the transmitter assigned to each item. These low frequency electromagnetic fields are generated in a pattern whereby an item passing through a portal must consecutively pass through the first and second receiving regions in a specific order. The order by which an item bearing an identification device passes through the first and second receiving regions at the portal determines the direction-of-travel of the item into or out of a zone. When an item passes through a receiving region, its identification device emits a signal of a first data packet which includes the unique identification number that is received through the first and/or second antenna corresponding to the receiving region through which the item has passed. The receiver sends to the node computer a second data packet which includes the unique identification number of the item and a direction-of-travel signal that corresponds to the antenna that received the transmission. The node computer verifies these signals.

The node computer operates software provided with the zone location of the node computers and receivers in the domain, the portal that separate zones and the receiver and node computer assigned to monitor each portal. From the repeated direction-of-travel information received by a node computer, the node computer determines the zone in which an item is located and the direction from which it entered the zone. The method of placing receivers at portals—physically constrained points in a facility—requires less receivers to determine the location of an item and removes the possibility that an item could evade the receivers thus providing a high tracking rate for the movement of an item. Additionally, the use of the dual adjacent receiving regions in a portal permits the transmitters to generate an electromagnetic field that must cover an area only as large as the portal permitting the use of less powerful transmitters and receiver configurations, and correspondingly lower energy and operational costs for the system. The dual adjacent low receiving regions also enable a determination of the direction-of-travel of an item as it moves through an environment enabling proactive responsive actions to be taken in response to or in anticipation to the movement of an item.

The node computer links with a controller computer sending information received from the transmitter such as the item's identification number and other internally developed information like the direction of travel information and the time associated with the receipt of the transmitted information. In conjunction with the node computer, the controller computer determines and records the location of an item and the time the item entered that location in the environment. This process repeats each time an item bearing an identification device enters the receiving regions stationed about each portal. Controller computers maintain a record for each item that includes the location of the item as well as constraints to movement placed on an item, and actions to take in response to violations to the constraints to movement or violations in movement. Periodically, or upon the movement of an item through a portal, the controller computer compares the location of the item against the constraints to movement for that item. If a constraint is violated, the controller computer reviews the predefined actions to be taken if a violation in movement occurs. Such responses involve activating warning devices such as a user terminal or work station, electronic sign, a voice synthesizer, a monitor, or video camera to provide warning or alarms directed to the specific unauthorized movement of the item. Additionally, the controller computers continue to track the unauthorized movement of in item throughout the environment and provide the capability to activate warning devices based on the anticipated movement of the item through an environment based on direction-of-travel of an item through portals. The response and warning capabilities of the present invention provide more than mere information on the location of an item but also take user programmable active steps throughout the environment to warn of the unauthorized movement of an item and take anticipatory or reactive actions to attempt to curb the unauthorized movement of an item. The system also provides for the tracking of a person moving an item and responding to violation in movement of either the person or the item by providing warnings to that person directly to stop an unauthorized movement through warning devices and alarms available to the system and controlled by either the node computer or controller computer.

A central server coordinates controller computers in the environment. The central server maintains a database of records for all items not currently present in the environment or items in transit between domains. As an item moves from one domain to another, the controller computer monitoring the departing domain passes the record of the item to the central server when the item passes through a portal that marks an exit from the domain. The central server maintains the record for the item until the item passes through another portal permitting the item to enter a new domain, at which time the central server passes the record for the item to the controller computer monitoring the new domain.

The central server is also designed to connect to third computer systems through a system interface. The central server generates reports on the status and history of locations for each item and passes the reports through an interface to a computer network and databases maintained in the environment independently from the system. The central server also possesses the ability to interface with other third party communication systems existing independently in the environment such as computer networks, telecommunication networks, and pager systems. Through the third party communication systems, the central server may provide information to these systems or control these systems to provide additional alarms or warning regarding an unauthorized movement of an item. With this adaptation, the system is capable for utilizing communication systems already in place in an environment thereby alleviating the cost associated with providing new, duplicative systems or implementing new communications systems in the environment which people are unfamiliar with or not trained to use.

BRIEF DESCRIPTION OF THE DRAWINGS

These and other aspects and advantages of the present invention will become apparent upon reading the following detailed description and upon reference to the drawings, in which.

Figure 1:
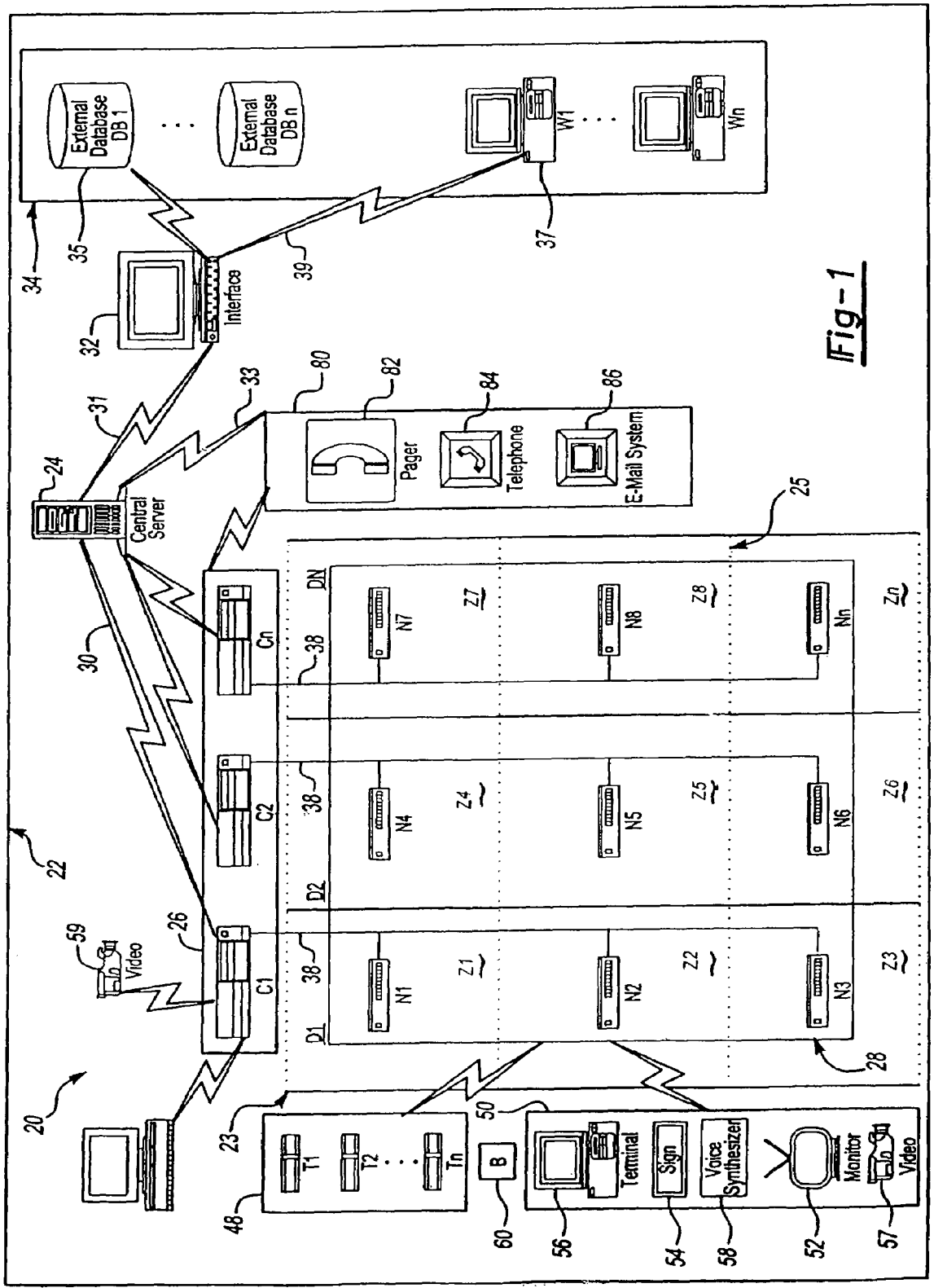
FIG. 1 is a block diagram illustrating an example of the configuration of the area-directional tracking and event-driven information system, according to the present invention.

The invention is amenable to various modifications and alternative forms. Specifics thereof have been shown by way of example illustrated in the drawings and will be described in detail. It should be understood, however, that the intention is not to limit the invention to the particular embodiments described. On the contrary, the intention is to cover all modifications, equivalents, and alternatives falling within the spirit and scope of the invention, which is defined by the appended claims.

DETAILED DESCRIPTION

The present invention is applicable to a variety of area-specific tracking and event-driven information methods and arrangements for use in a system to effect monitoring, tracking, locating, and identifying of items and responding to events based on time and the location of an item in a commercial environment. The invention has been found to be particularly advantageous for use in systems for facilitating the monitoring of items in a health care, manufacturing, and business office environment where items move throughout the facility. The invention has also been found to be particularly advantageous to identify movements of items unauthorized by management of the facility and alerting management of the unauthorized movement of the item. An appreciation of various aspects of the invention can be gained through a discussion of various application examples herein.

The present invention includes a system 20 comprised of a computer network and deployment of multiple nodes that connect to sensors that track items in an environment 22 assigned to system 20 for monitoring. Environment 22 represents the physical area in which system 20 operates and includes all items that reside or work within environment 22. In actual application, environment 22 is any physical space including a multiple floor hospital ward, a manufacturing plant, an office building or the like.

In environment 22, system 20 tracks and monitors items. Items include any non-fixture tangible items that can be readily transported or moved including tools, equipment, furniture, files, books, or carts, but can also include an object regardless of the mobility or immobility of the object. Items also include subjects such as persons and potentially other biological creatures that enter and leave environment 22. Within environment 22, each item can be assigned to a particular class and category predetermined by administrators or management of environment 22 to group and identify items. The class and category listings are arbitrary designations provided for the user to aid in the classification of items.

For example, eight major categories exist in system 20 including categories dedicated to system 20 as a whole, unique identification numbers, equipment, people, locations, time, vendors, and history. Both classes and categories can be divided into sub-classes and categories. Each class and category combination is assigned pre-determined constraints to movement in environment 22. A set of instructions accompanies each class and category combination designating action to be taken by system 20 should an item violate its constraints to movement or move without proper authorization.

Overall, classes and categories for items can be adapted in system 20 to conform with classifications already in use by administrators of the finance department of a facility to conform the classes and categories to class distinctions used to group persons based on pay level or job responsibilities or to group assets based on purchasing or amortization requirements.

For example, a particular class and category includes all maintenance workers in environment 22. The maintenance workers would be assigned to the same class but to different categories. Maintenance supervisors would be placed in a class providing a range of movement throughout environment 22 and authorization to move all items. In contrast, an electrician would be assigned to a different category in the same class limiting this worker to a specific work area in environment 22 and authorization only to move other specific items necessary to perform his job responsibilities. Likewise, inanimate items are also assigned to different categories and classes. Maintenance equipment such as ladders and tools could be in a separate class from computers. Each class is subdivided into categories that define the range of movement for items in the category and the personnel authorized to move these items. For example, a ladder would be assigned to a specific category that corresponds to constraints of movement such as limiting use of the item to particular floor in environment 22 and to be moved by any maintenance worker. On the other hand, a drill assigned to another category would be assigned different constraints to movement such as permitting its movement throughout environment 22 but only by maintenance workers qualified to operate that equipment. Assigned to each class and category is a set of default instructions to be taken by system 20 if an item violates its constraints to movement established for the class and categories. Such instructions involve actions such as activating a warning alarm, placing a warning message on an electronic sign and/or contacting security through a user terminal.

Domains 23 subdivide environment 22 into smaller physical areas. A domain contains all identified items that exist, ingress into, and egress from the domain. Environment 22 has at least one domain, although practical application of system 20 would typically require multiple domains, with each domain representing a distinct physical area in environment 22. Domains represent physical constraints that are structure-specific within environment 22. For example, domains could represent individual floors of a hospital ward or office building and the various sections of a manufacturing plant such as the warehouse, the assembly floor, offices, and the maintenance shop. FIG. 1 shows domains 23 labeled as D1–Dn, where "n" is determined from the layout and design configuration of environment 22.

Domains 23 are divided into smaller physical regions or zones. Zones 25 are typically physical rooms, corridors, and stairwells within environment 22 typically defined by established barriers such as walls, floors, ceilings, bars, windows, fixed equipment and by other subdivisions that would confine movement of items. A zone comprises at least one portal, a point of ingress to and egress from the zone. Typically, a portal includes doorways, stairs, escalators, elevators, or other points, where items move between zones 25 within a domain or between domains 23 in environment 22. FIG. 1 shows zones 25 labeled as Z1–Zn, where "n" is determined from the layout and design configuration of environment 22.

A unique identification number identifies each item within system 20. An identification device carries the identification number and attaches to or is carried by each item. In system 20, the identification number can be any integer number, although identification numbers ranging from 0 to 1,048,576 is sufficient to uniquely identify all items in environment 22.

Accompanying each unique identification number, at least one record is created such as a history file initialized for each item introduced into environment 22 to be monitored by system 20. A record comprises numerous data fields that include information about the item and could include its class and category, a description including the actual name of the item and/or its physical identification number such as an equipment serial number, if an object, or social security number, if a person, home location of the item, constraints to movement of the item, actions to be taken upon violation of constraints to movement of the item (a violation in movement), current location of the item, and the last time the location of the item was identified by system 20. Records may provide event and history logs or parameters defined by a user to react to the movement of an item. Data in each record field is coded and stored in numerical, logical and character strings to be interpretable by software that operates a central server 24, controller computers 26 and node computers 28. Some data fields, such as the constraints to movement, are variable, dependent on domain where the item is currently located. For example, an item may possess no constraints of movement throughout an entire domain while it remains in that domain, but could receive an entirely new set of constraints to movement if the item is moved to another domain. Overall, constraints are site wide, modified by location, time and association.

Central server 24 maintains the record of an item when the item is outside of environment 22. For example, a record of an employee would be maintained by central server 24 when the employee exits the environment 22 to leave work for the day. When the employee returns to environment 22 the next day, the employee passes through a portal into a domain 23. The controller computer 26 detecting the arrival of the employee into the domain but finding that it has no record for the item, contacts central server 24 requesting the record. Central server 24 checks its database for the record for the item, locates it and passes the record through communication link 30, an Ethernet network or other data transfer network, to the appropriate controller computer 26 for that domain. Upon receipt of the record, controller computer 26 updates the record and history file to reflect the current location of the item in domain 23 and update the constraints to movements and violations in movement maintained in the record, if necessary, to reflect the new location or time associated with the item or changed constraints entered into system 20 for the item. Controller computer 26 will maintain and continuously update the record while the item remains in the same domain 23.

System 20 monitors and tracks items in environment 22 through the use of a network of computers which could include controller computers 26 and node computers 28. For example, node computers 28 identify the location of each item assigned to a specific domain. Node computers 28 receive information based on the identification and direction-of-travel of each item through a portal and determines the location of the item in environment 22. Node computers 28 pass the location of the item to a controller computer 26 which maintains the record and history file on each item. FIG. 1 shows controller computers 26 labeled as C1–Cn and node computers 28 labeled as N1–Nn, where "n" is determined from the layout and design configuration of environment 22. Controller computer 26 may also receive from node computer 28 the identification number of the item, the time of movement of the item, direction of travel information and other status data and perform the logical correlation of linking the identification number of the item to location of the node computer 28, and as such the location of the item in the domain. The determination of the location of an item by node computer 28 or controller computer 26 is completed by software designed to manipulate data programmed to correlate the physical location of the node computer 28 in environment 20 in relationship to the zone 25 and domain 23 designated in the environment and the direction of travel information of the item collected by node computer 28.

All controller computers 26 connect to a central server 24 that collects all records for items in domains 23, prepares the information for export outside the system 20 to external systems 34, through interface 32 which is a commercially available administrative computer or server.

A communication link 30 interconnects central server 24 to controller computers 26 and node computers 28. Central server 24 manages the operation of system 20 in environment 22 by coordinating controller computers 26. Central server 24 comprises a central processing unit, electromagnetic storage media, memory, a network connection and external ports. Central server 24 supports the typical configuration of a personal computer or workstation commonly known in the art with sufficient computing power, memory, storage and speed to control the operation of the system 20 and manage the manipulation of data collected from environment 22. An uninterruptible power supply connects to central server 24 to provide temporary back-up energy to maintain all functionalities of central server 24 in the event of a power loss in environment 22. Each controller computer 26 also provides an uninterruptible power supply, which supplies power to all of the node computers 28 connected to the controller computer 26.

Central server 24 operates through a commercially available operating system. Central server 24 runs software that stores all system-wide information such as the class and categories for all items, routing all operational instructions, collecting data and records on items stored by controller computers 26 to supply information on the location of items for exportation to external systems 34 in environment 22 that are not controlled or managed by system 20. Additionally, central server 24 maintains a transitional database that temporarily stores records from controller computer 26 on each item in transit between domains and items that have left environment 22 altogether. The software operated by central server 24 uses programming techniques commonly employed in the art to accomplish the desired functionalities and provide a user of system 20 an easy to use, single point to program and configure system 20 and collect data therefrom.

A programmatic link 31 connects central server 24 to interface 32 to permit the programming of central server 24, controller computers 26, and node computers 28 and the exportation of data collected from system 20 to external systems 34. Link 31 provides a firewall that protects the internal functioning of system 20 from inadvertent or erroneous programming that could otherwise be introduced at interface 32. Generally, interface 32 is a personal computer with a standard configuration readily known in the art. Programmatic link 31 prohibits the transfer of unauthorized data or uploading of foreign software to central server 24, thereby providing a firewall against corrupt data and viruses that may otherwise impede operation of system 20 or damage the hardware and software components of system 20. Programmatic link 31 comprises a data cable through which data may be transferred from central server 24 in interface 32, however, it is appreciated that any network technology such as fiber optics, radio, optic transmissions, infra-red or others known in the art, could be employed.

Interface 32 is designed to manage all tasks associated with interfacing and coordinating system 20 to environment 22. Real-time event processing internal to the system 20 is manipulated via tokenized records, multi-dimensional array pointers, that increases processing speed. Through interface 32, user and system functions governing system 20 are programmed and designed aiding real-time event processing for system 20. Interface 32 may also coordinate the transfer of records and history files between controller computers 26 when an item moves between domains 23.

Software programmed through means commonly known in the art operates in interface 32 and manages the information to be passed to external systems 34 for further recordation and processing. Interface 32 connects system 20 to external systems 34 to provide information collected by system 20 on a historical and record-keeping basis. Interface 32 provides data files in ASCII format or other format compatible for exportation and interpretation by databases 35, labeled as DB1–DBn, in FIG. 1, where "n" is determined by the facility encompassing environment 22. Databases 35 maintain records on financial information, inventory, equipment use, depreciation of equipment, quality control statistics, payroll, and other data managed by the facility. Through interface 32, a user requests central server 24 to generate reports on the status and history of items in environment 22. Central server 24 contacts controller computer 26 to obtain records and history files on each item and generate reports from that data.

Interface 32 receives reports through programmatic link 31 and makes the reports available via a terminal associated with interface 32 or directs the reports to databases 35 for storage, manipulation, or evaluation independent of system 20. Reports requested through interface 32 can be for a single item, all items, or any grouping therebetween. Interface 32 also automatically accesses reports generated by central server 24 periodically on a delay basis to back-up system 20 and maintain a record of use of each item for historical reference after system 20 purges the history files maintained for each item to free memory and storage space within system 20.

Interface 32 also sends information to workstations 37 positioned throughout environment 20 to provide real-time information on the status of particular items or to provide warning messages relating to unauthorized movement of an item. In FIG. 1, workstations 37 are labeled as W1 to Wn, where "n" is determined from the layout and design configuration of environment 22. Workstations 37 are commercially available personal computers operating under commercially available operating system and running a system interfacing software linking workstations 37 to interface 32 through communications links 39. The system interfacing software provides a window projected on the desktops of workstations 37 for displaying the real time information or warning message received from central server 24 through interface 32. Workstations 37 can be placed throughout environment 20 at locations where real-time information on the status of an item is necessary such as at a security office or administration office. Additionally, system 20 can provide real-time information on items to workstations (not shown) located outside of environment 22 through communications links 33 which accesses or controls third party communication system 80 such as telephone or data lines, if monitoring of items within environment 22 has been out-sourced such as to a third-party security company.

Workstations 37 also perform the role of assigning items to system 20. Through the system software, an authorized user of system 20 may add, edit, or delete a record for an item in environment 20. Through the software window, the user may input the information assigned to the record of each item. Such information includes its unique identification number used by the system, the name of the item (persons name, equipment description), identification number (employee's ID number, patient number, equipment identification number), the home or base location for the item in environment 22, constraints to movement, and actions in response to unauthorized movements. Additionally, the items may be assigned to a class and category through workstation 37 thereby automatically assigning default values for a variety of information in the record for the item including the home location, constraints to movement, and responses to restrictions to constraints to movements.

To provide easy input, modification, and interpretation of records, especially the constraints to movements and responsive actions, the system software operating on workstations 37 permits an authorized user to enter information in a sentence and phrase form that creates a relationship command. The relationship command uses a list of predefined phrases that identify actions, classes, and categories. These phrases are available in the system software on workstation 37 in a menu driven format with the actual commands provided for use in the system variable depending on environment 22 and constraints imposed by administrators of environment 22.

Once a record is created for an item, the unique identification number assigned to the record corresponds with the identification number assigned to an identification device to be affixed to an item. The location of the item is inputted into system 20 and the record for the item by passing the identification device under a receiver 48 in environment 20, which in turn transmits the unique identification number to a node computer 28 which determines the location of the item and in turn passes the location information relating to the unique identification number to a controller computer 26 responsible for maintaining all records for items in the domain.

Overall, relationship commands are groups of phrases dedicated to identifying the class, category and unique identification for each item. The software permits multiple sentences to comprise a relationship command to be applied to a particular item or as a default for an entire class or category of items. Phrases in the relationship command define the events that trigger the start of constraints of movement and the time and locations associated with such constraints. For example, a relationship command regarding an Item X, a pump, could be created through the system software as follows: "Starting now, equipment classified Medical in category Pumps and named Item X must not be out of Area Y for longer than a period of n years, n months, n days, n hours and n seconds, or a terminal alert with audible alarm will be sent to user terminal Z saying 'Medical equipment of category Pump named Item X has exceeded its allotted time out of Area Y.'" This same relationship command broken down into user-selected phrases (phrases in "( )") provided in menus by the system software: "(Starting now,) equipment classified (Medical) in category (Pumps) and named [Item X] (must not) (be out of) (Area) [Y] (for longer than) (a period of) [n] (years,) [n] (months,) [n] (days,) [n] (hours) and [n] (seconds,) (or) (a terminal alert) (with audible alarm) (will be sent to) (user terminal) [Z] saying ('Medical equipment of category [Pump] named

[Item X] has exceeded its allotted time out of Area [Y].')" Phrases in [] correspondingly apply to an item's specific information or constraints. Additionally, default relationship commands that apply to all items in a category can be created through using the name of the category instead of the name of an item when creating the relationship command. The relationship command is parsed by system 20 with the information from the relationship command broken down and stored in various fields of the record for the item for easy interpretation and evaluation of the record by system 20 by methods commonly-employed in the art. In all cases, the actual relationship commands entered by the authorized user through workstation 37 are stored by system 20 and displayed for each item when modifications to the relationship command is necessary.

Central server 24 connects through communications links 30 to each controller computer 26. Controller computers 26 also connect directly to each other through communications links 30. Generally, controller computers 26 interact through the coordination of central server 24 transferring records on items moving through domains monitored by different controller computers 26. Communication links 30 employ commercially available network structure and conductivity protocols commonly known in the art such as Ethernet, however it is appreciated that other network technology now known or to be developed that permits the transfer of data could alternatively be employed.

Controller computers 26 comprise a commercially available central processing unit, electromagnetic storage media, memory, databoard, and a network card. Each controller computer 26 is also connected to an independent uninterruptible power supply to provide temporary back-up energy to maintain all functionalities of controller computers 26 and node computers 28 in the event of a power loss in environment 22. Controller computer 26 also includes at least one node computer interface enabling a connection of controller computer 26 to at least one node computer 28 via a communication link 38. In one embodiment, communication link 38 is a multi-drop network permitting the transfer of data and power between controller computer 26 and node computer 28, however, communication link 38 may provide connectivity and conductivity between controller computer 26 and node computer 28 through a variety of technology known or to be developed in the art. In application, each controller computer 26 can connect to a maximum of 64 independent node computers 28, although it is appreciated that advancement in technology or reconfiguration of controller computer 26 by one of ordinary skill in the art could permit connection of each controller computer 26 to a greater number of node computers 28.

Controller computers 26 also connect to and interface with third party communication systems 80 that operate within environment 22. Third party systems 80 include pager system 82, a telephone/cell phone system 84, or email system 86. Dependent on the action of an item, controller computers 26 access the third party system to provide a warning or send a communication to an item requesting that specified action be taken. For example, if an emergency occurs requiring the immediate attention of person X in environment 22, a user of system 20 may access user terminal 56 to request that a page be placed through pager system 82 or a call be placed directly to the cell phone of person X via telephone system 84 located in environment 22.

Each controller computer 26 connects to at least one node computer 28 specifically designed to collect data on the location and movement of items. Node computer 28 is a commercially available, low-power embedded controller comprising a central processing unit and memory. Node computer 28 is assigned to particular domain 23 and communicates with the controller computer 26 that controls that domain through a network interface connected to a multi-drop network 38 that also supplies power from controller computer 26. At least one serial port and at least one parallel port extend from node computer 28 permitting the node computer 28 to operate receivers 48 (T1, T2, . . . Tn) for monitoring and tracking items and communicating with a variety of peripheral devices 50 for alerting or warning users of system 20 as to the status, location, and violations of constraints of movement of an item. In one embodiment, each node computer is equipped with 4 serial ports and a single parallel port. Through serial ports, node computer 40 collects information on the location and direction-of-travel on items from receivers 48 or transmits data to provide a user-defined response to the movement of an item through peripheral devices 50.

The processing unit of node computer 28 comprises a two board set. A first board supports the four serial ports and two parallel ports. A second board provides power supply and interfacing functions. A first serial port is used for the interface to network node computer 28 to controller computer 26. Remaining serial ports associated with node computer 28 pass through protection circuitry then to the three external ports to connect to related equipment such as a receiver 48. A first parallel port is used to read an identification number assigned to each node computer 28. The identification number distinguishes each node computer 28 from other node computers 28 networked to the same controller computer 26. A second parallel port is split to comprise a two bits per external port permitting node computer 28 to identify the type of device connected to it, such as a receiver 48. Power is also passed through these external ports of node computer 28 to power connected devices like receivers 48.

Receivers 48 are configured to receive electromagnetic signals from near field inductive, low frequency proximity transmitters, although receivers 48 could also receive signals from other transmitting devices operating through radio frequency, magnetic, infrared, or optical transmissions.

In one embodiment, the receivers 48 operate at low frequencies which will not interfere with other equipment in environment 22. In one embodiment, the receivers 48 operate at a frequency of 125 kHz or less. However, it should be noted that the frequency at which the receivers 48 operate will be dependent upon the equipment in the environment 22, and thus, the present invention is not limited to any specific frequency range. Most equipment sensitive to radio waves is sheltered from below frequencies of 125 kHz thereby permitting the operation of receivers 48 in environment 22 without interfering with other equipment. Any frequency avoiding interference with surrounding equipment in environment 22 could be employed. At least one receiver 48 is placed in each zone 25 about the portal into and out of the zone. Additionally, at least one receiver is placed at each portal separating domains 23, zones 25, and all portals permitting ingress and egress from environment 22.

In another embodiment, the receivers 48 use ultra wide band technology and are further adapted to determine a distance between the receiver 48 and a transmitter 90. The system may also be adapted to track and store location information (two dimensionally or three-dimensionally) based on signals received from the receivers 48.

Figure 2:
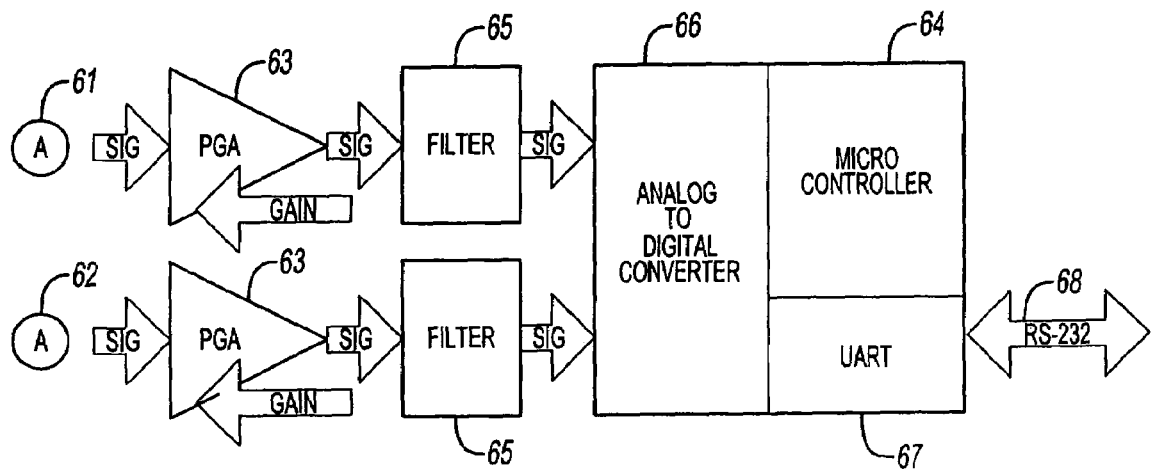
FIG. 2 is a block diagram illustrating the configuration of a receiver according to the present invention.

FIG. 2 illustrates the configuration of the receivers 48 of the present invention. Receivers 48 include a first external antenna 61 and second external antenna 62 that receive a first data packet emitted from transmitters associated with identification device 60. Antennas come into programmable gain amplifiers 63, with gain controlled by microcontroller 64. The amplified signal passes through filters 65. Filters 65 and amplifiers 63 provide impedance matching and 10 dB of on-frequency gain resulting in a narrow bandwidth. In the present invention, filters 65 are active, six pole Bessel filters although it is understood that other filters of varying configurations and operating parameters commonly employed in the art could be employed. Antennas 61–62 are active, modified loop antennas. The loop dimensions are 2"×24", with an open-air coil of 30 mH. The combination of the active antennas 61–62 and filters 65 result in a very narrow bandwidth bandpass response. At 32 KHz and 66 KHz, attenuation is −68 dB, assuming a center-frequency 46.607 KHz reference of 0 dB.

The outputs of filters 65 are read by an integrated 10 bit analog to digital converter 66 designed to convert the analog signal received to a digital data packet for subsequent normalization and data extraction. Data is processed in real time upon identification of a signature START data associated with the data packet received from identification device 60. Once the first data packet is received, the packet is buffered in RAM associated with converter 66. Enough RAM is provided for eight data packets to be recorded. Time required for a single packet to be transmitted is 33.3 mS, although it is known in the art that various data transfer schemes and protocols could be employed that could enhance the data transfer rate thereby reducing the transmit time. At the end of the acquisition phase, the first data packet is processed via a three-pass normalization and data extraction algorithm programmable by one of ordinary skill in the art. This processing is done in the background, while data acquisition continues in the foreground. Gain control is managed by the foreground processing routine to prevent filter saturation. A semaphore flags any changes to the gain control register for subsequent handling by the data recording subroutine in the event a data packet is currently being recorded. Background processing time is significantly less than packet transmission time, so it is expected that in use only two buffers will be in use (one containing the completely received data packet, one buffering the in-process packet). An antenna channel identifier is appended to the 4 byte binary second data packet. Overall, receiver 48 receives and decodes the packet, performs error checking if necessary, converts the first data packet to a second data packet which encompasses a three byte binary string which includes a direction-of-travel code associated with a prefix byte corresponding to antennas 61–62 that received the first data packet from the transmitter. The second data packet is then transmitted to node computer 28 through a universal asynchronous receiver transmitter (UART) 67 which links to a communication link 68 such as serially via the RS-232 port. However, it can be appreciated that the UART 67 and communication link 68 can be employed through any variety of devices and the processing and configuration of data used by receiver 48 could be arranged through various means and protocols commonly known in the art.

Microprocessor 64 driving the receipt of the first data packet and conversion to the second data packet is an Atmel AT family embedded RISC microcontroller running at 6 MHz, although it is known that various other commercially available microcontrollers could be employed operating at the same or other speeds. An internal counter/timer circuit generates a clock, which triggers converters 66 and generates the interrupt for the real-time clock. Power for the receiver is provided by a node computer 28 with power for the active antennas 61–62 passing through receiver 48 from node computer 28. Peripheral devices 50 include a video monitor 52, visual messaging device 54, a user terminal 56, a voice output module 58, a video or cctv camera 59 as well as other devices known to or to be developed in the art to outputting warning messages, alarms, or signals. Peripheral devices 50 provide direct warnings or alarms in response to violations in constraints to movements to warn an item of an authorized movement directly or alert a person with responsibility over an item of the violation of the constraint or movement so that responsive action can be immediately taken. In one embodiment, node computer 28 is equipped with four serial ports, three ports assigned to receivers 48 and one to other peripheral devices 50, although one of ordinary skill could appreciate that additional serial ports could be added to node computer 28. Software accompanying node computer 28 provides the functionality to operate the alarm and warning devices enabling node computer 28 the ability to communicate with peripheral devices 50 connected to node computer 28.

Each node computer 28 operates non-volatile core software through its controller. The software is developed through commonly known computer programming language and operates in a 16-bit environment. The software controls communication between node computer 28 and controller computer 26 via communication link 38, pulsing and reading time-critical transmissions from receivers 48, and passing data to peripherals devices 50 to activate the capabilities of these devices.

Configurable identification devices 60, such as badges or tags label items assigned to be tracked and monitored by system 20. Identification devices 60 comprise a transmitter 90 operated by an independent power source, like a battery, and programmed with an identification number. A casing encloses transmitter 90 and its power source. In one embodiment, identification devices 60 possess the length and width of a standard credit card. An identification device 60 affixes to an item through the use of an adhesive or other form of adherence such as velcro®, a button, magnet or strap. Items such as people wear identification devices 60 as a name or identification tag or as part of an identification band worn on a wrist. Transmitter 90 of each identification device 60 rapidly emits a periodic low frequency, near field, omni-directional electromagnetic transmission field through which a signal encoded with first data packet is encoded. The transmission field generated by identification devices 60 is shaped like two truncated cones, with their apex at the transmitter coil. The field provides a transmission range extending up to six feet or two meters from transmitter 90, although it is appreciated that the field diameter may vary depending on the needs of system 20. The transmission range of transmitter 90 permits accurate identification of data from transmitter 90 by receiver 48 from a range sufficient to cover the typical cross-sectional dimensions of portals such as doorways, stairwells, and hallways. The transmission range promotes the passive benefits of system 20 by permitting the continuous identification of items in environment 22 as the items generally move about or are moved about environment 22 without requiring the items to move in a predetermined path or with active additional movements to pass identification device 60 by receiver 48 in close proximity, such as in close proximity systems that require scanning or near-distance proximity of two feet or less between the transmitter and receiver to effect transfer of data.

Figure 3:
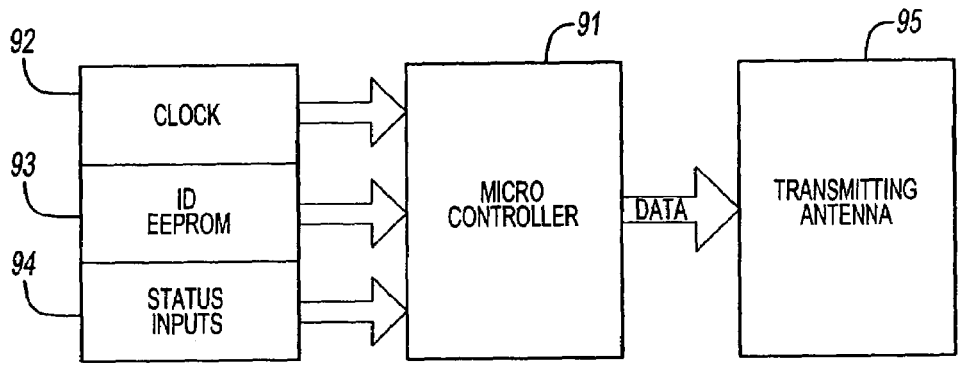
FIG. 3 is a block diagram illustrating the configuration of a transmitter according to the present invention.

FIG. 3 illustrates the internal structure of transmitter 90. Transmitter 90 is controlled by microcontroller 91 that receives information inputs from clock 92, non-volatile ID EEPROM (electrically-erasable programmable read-only memory) 93 and status inputs 94 to emit a signal at a carrier frequency of 47.607 KHz, with a 600 Hz AM modulation scheme, although any frequency below 125 KHz could be utilized that matches the frequency of receivers 48, enabling receivers 48 to pick-up the signal of identification device 60 when the field generated by the transmitter passes within the receiving range. A carrier frequency emitted from transmitter 90 does not interfere with frequencies employed by computer monitors in common use. Time base for both carrier frequency and frequency modulation is coordinated by clock 92 through a crystal to promote accuracy and stability of the data transmission. ID EEPROM is programmed with the unique identification number assigned to each identification device 60 and carried in the data transmitted by transmitter 90.

Microcontroller 91 of transmitter 90 emits a first data packet through a transmitting antenna 95 utilizing a Trinity (Base 3) protocol to make maximum use of available bandwidth while keeping receiver complexity to a manageable level. An AM modulation technique is used, where 0 is defined as no carrier, 1 is 70% (−3 dB from MAX) of maximum carrier and 2 is defined as maximum carrier level. A single transmission is comprised of 20 TRITS (TRinary bITS) which include: one TRIT identifying the START of the data packet, two TRITS corresponding to the group identification number for the item, two TRITS of corresponding to the status of the item, twelve TRITS corresponding to the unique identification number of the item, and three TRITS relating to error detection data. The first data packet may be organized in any other manner or interpreted through other protocols commonly known in the art. Antenna 95 is a circuit loop antenna with a loop dimension of approximately 2 inches by 4 inches with an open-air coil of 20 mh. Antenna 95 may also encompass other designs and configuration either commercially available or known in the art.

Figure 4:
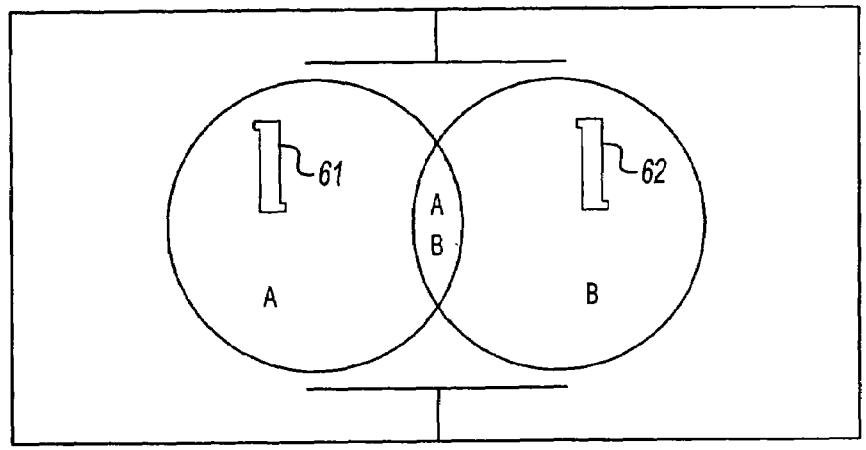
FIG. 4 is a logical diagram illustrating the concept of a portal and paired antennas as a logical construct.

Receivers 48 receive the first data packet from identification device 60 through the use of first antenna 61 and second antenna 62. Both first antenna 61 and second antenna 62 generate two separate receiving regions. The dual receiving regions of first antenna 61 and second antenna 62 work in tandem to determine the direction-of-travel, if any, of identification device 60 as it passes through a portal between zones 25 or domains 23. As shown in FIG. 4, the first antenna 61 defines a receiving region A and the second antenna 62 defines a receiving region B. Receiving regions A and B are oriented about the portal between a first zone and second zone in a manner in which any item passing through the portal must pass through receiving regions A and B.

As an item with an identification device 60 passes from a first zone into a second zone through the portal connecting the zones, identification device 60 enters receiving region A provided by the first antenna 61 of receiver 48. As identification device 60 enters the field A, its transmission field enters receiving field A causing antenna 61 to receive the first data packet of identification device 60. Receiver 48 converts the first data packet to a second data packet and appends a direction-of-travel code corresponding to receiving region B. Node computer 28 receives the second data packet and determines a location of the item from the direction-of-travel code and the location of the receiver. Once a new location of the item is determined, node computer 28 transfers the identification number and location of the item to controller computer 26 to update the record associated with the unique identification number.

If the item continues to move into the second zone, identification device 60 passes into receiving region B. As identification device 60 enters receiving region B, its transmission of the first data packet is received by antenna 62.

In contrast, if the item never enters receiving region B and leaves receiving region A, this movement would result in a loss of transmission from identification device 60 in receiving region A and indicate to node computer 28 that the item never completed its movement between zones and instead returned to the first zone from which it originated. Accordingly, the dual antennae of each receiver 48 positioned in each portal in environment 22 permits the tracking from zone to zone and provides information in which to anticipate a projected course of travel of an item without having to provide a vast array or grid of receivers throughout environment 22 to calculate the location of the item at any point in time.

Figure 5:
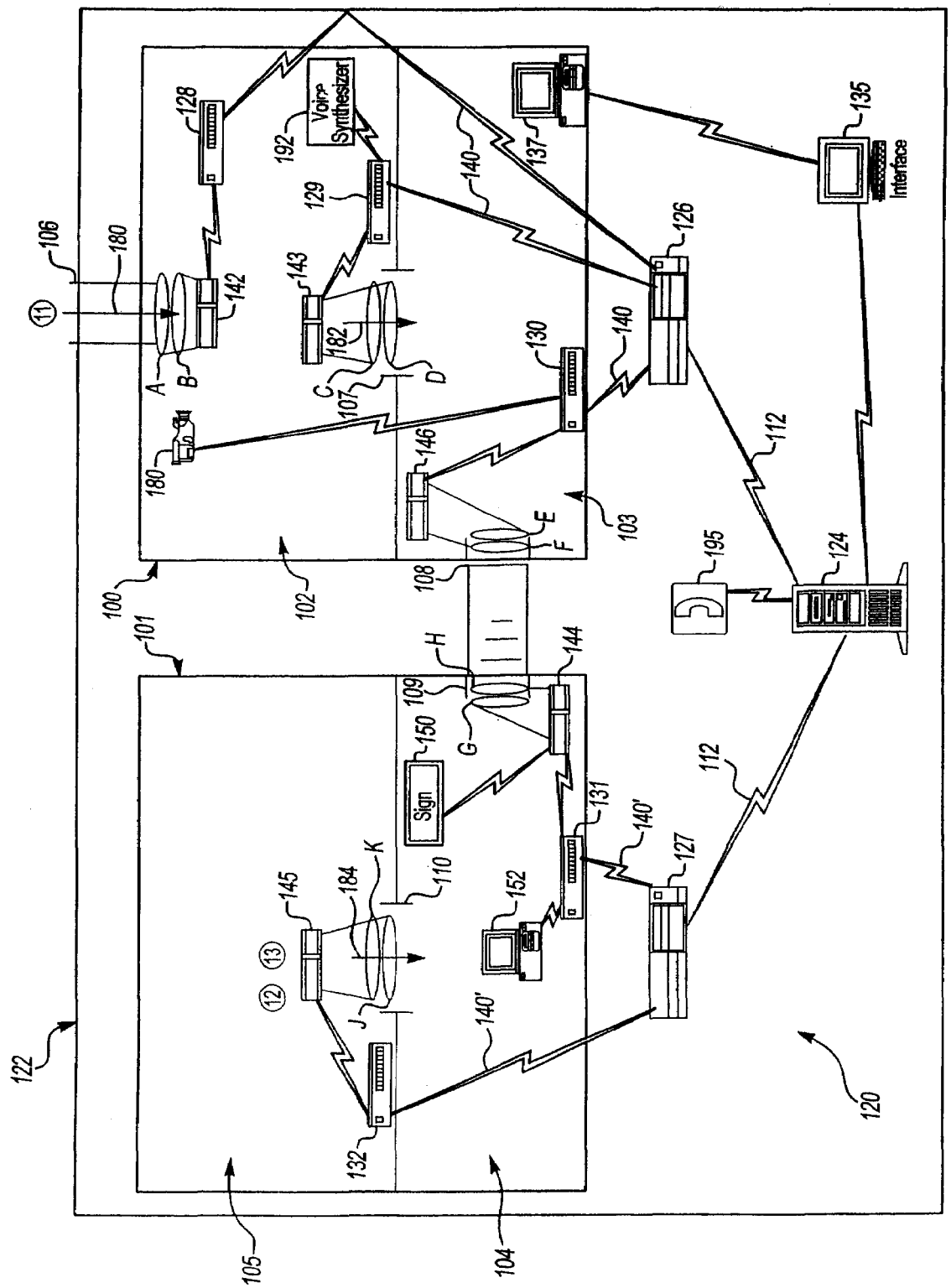
FIG. 5 is a facility layout diagram for an environment employing the present invention.

FIG. 5 illustrates a first domain 100 and a second domain 101 of environment 122. First zone 102 and second zone 103 comprise domain 100, and third zone 104 and fourth zone 105 comprise domain 101. A first portal 106 is a doorway from outside environment 122 and provides a point of ingress and egress into and from first zone 102, domain 100, and environment 122. A second portal 107 is a doorway separating first zone 102 from second zone 103 in domain 100. A third portal 108 is a lower entrance to a stairwell connecting first and second domains 100 and 101. A fourth portal 109 is the upper entrance to a stairwell connecting the same domains. Likewise, a fifth portal 110 is a doorway separating third zone 104 from fourth zone 105 in domain 101.

A controller computer 126 monitors the movements of all items in domain 100 and a second controller computer 127 monitors the movements of all items in domain 101. Both controller computers 126 and 127 connect through an Ethernet network 112 with central server 124 that coordinates the activities of controller computers 126 and 127. Central server 124 connects through a programmatic link 114 with interface 135, a workstation running software permitting specialized management interaction of system 120. Interface 135 connects to workstation 137 that maintains a backup of all records of items, as well as tracks the history of items' movements in environment 122 for security, asset accounting, and human resource purposes.

A first node computer 128 tracks movement of items entering and exiting environment 122. Node computer 129 tracks movement of items between first zone 102 and second zone 103. A third node computer 130 monitors items entering and exiting second domain 101, and a fourth node computer 131 monitors items entering and exiting first domain 100. A fifth node computer 132 tracks the movement of items between third zone 104 and fourth zone 105 in second domain 101. Node computers 128–130 connect to a controller computer 126 via a multi-drop network 140 that provides for the exchange of data and power to operate each node computer 128–130. Similarly, node computers 131 and 132 connect to second controller computer 127 through multi-drop network 140'.

First node computer 128 supports a first receiver 142 that resides about first portal 106 and provides a first receiving region A provided by one antenna and a second receiving region B provided by a second antenna. Controller computer 126 connects to a peripheral device, video camera 180 mounted to the wall near portal 106 that records digital pictures of each item as it enters and leaves environment 122. The camera 180 connects directly to a video cord plugged into a portal bus of controller computer 126. Controller computer 126 operates commercially available software to manipulate camera 180.

Second node computer 129 supports a second receiver 143 that resides about second portal 107 and provides a first receiving region C provided by one antenna and a second receiving region D provided by a second antenna. Node computer 129 also connects to a peripheral device, a digital voice synthesizer 192 with speaker system mounted on a wall in zone 102. In zone 103, node computer 130 connects to receiver 146 that provides dual low frequency, directional fields E and F at portal 108.

In domain 104, node computer 131 supports a receiver 144 and an illuminated, digital scrolling sign 150 mounted to wall and viewable to traffic between points-of-way 109, 110. Receiver 144 equipped with two antennas that provide receiving regions G and H at portal 109. Likewise, node computer 132 provides a receiver 145 that provides receiving regions J and K in portal 110.

Arrow 180 shows the movement of an item I1, in this case an employee into environment 122. As item I1 enters portal 106, the identification device which item I1 wears transmits a near frequency transmission of a first data packet which includes a unique identification number that corresponds to the identification device and the item. An antenna that provides receiving region A receives the transmission of the first data packet. First receiver 142 receives the first data packet, converts it into a second data packet appended with a direction-of-travel corresponding to receiving region A and sends the second data packet to first node computer 128. First node computer evaluates the second data packet and determines the location of item I1 from the direction-of-travel code and the location of receiving region A in environment 122. Once evaluated, the location of Item I1 is passed to controller computer 126 for recordation.

Controller 126 scans its database for a record identified by the unique identification number. In this case, controller computer 126 will find no record for item I1 because the record for item I1 would be stored in central server 124 while item I1 is not present in any domain. For example, when an employee leaves environment 122 in the evening at the end of the workday, the record for that item would be stored in central server 124 until the item reenters environment 122. Here, controller computer 128 contacts central server 124 via network 112 sending it the location information associated with item I1. Central server 124 responds by scanning its database for a record associated with unique identification number of item I1. Central server 124 finding a record indicating that item I1 had exited domain 100 and environment 122 the previous evening, updates the record with the new location information and sends the entire record to first controller computer 126 to be stored in its database as long as item I1 remains in domain 100. Central server 124 may also send the record for item I1 to controller computer 126 to update the record with the new location information. The record for each item also contains information describing each item, its home location, video and audio images of the items, constraints to movements of the item, and alarm actions to be taken if the item violates the constraints.

As the item passes through low frequency field B, the unique identification number transmitted by the identification device worn by item I1 is received by first receiver 142 through the antenna that projects low frequency field B. First node computer 128 receives the data from first receiver 142 and sends the location information for the item to first controller computer 126. Simultaneously, controller computer 126 activates video camera 180 to capture a few seconds of digital video image of item I1 as it passes through portal 106. The video image is stored as part of the record of item I1. First controller computer 126 evaluates the record and the new location information and determines item I1 passed through both fields A and B without entering any other low frequency field. From this information, first controller computer 126 determines that item I1 moved in direction 180 and now is located in zone 102. Central server 126 stores this information in the record along with the time that item I1 entered the zone and its video image. Controller computer 126 then evaluates the current location of item I1 against the constraints to movement authorized in the record. In this case, the presence of item I1 in zone 102 is authorized requiring no further action.

In a similar fashion, if item I1 continues to move through zone 102 and passes through portal 107, second receiver 143 picks up transmissions as the identification device worn by item I1 passes through the low frequency fields C and D. As item I passes through fields C and D, second node computer 129 receives the transmission from receiver 149 and communicates the unique identification number detected and the location information to first controller computer 126. Controller computer 126 locates the record for item I1, evaluates the movement of item I1 through low frequency fields C and D and determines from this information that item I1 has exited zone 102, entered zone 103 and currently resides in zone 103. Once again, controller computer 126 evaluates the current location of item I1 against the constraints to movement listed in its records. Finding that item I1 is authorized to move into zone 103, no further action is taken.

FIG. 5 illustrates another example of the present invention. In this example item I2 is a notebook computer assigned exclusively to zone 105. Any movement out of zone 105 constitutes an unauthorized movement. Item I3 is a worker present in zone 105 who takes item I2 and transports it elsewhere in environment 122. Item I3 takes item I2 and moves it through a portal 110 as illustrated by arrow 184. This movement causes the identification devices assigned to both items I2 and I3 to pass through low frequency fields K and J generated by the dual antennas connected to receiver 145. The unique identification numbers emitted by identification devices of items I2 and I3 are detected first in field K and then field J. Node computer 132 receives these transmissions from its antennas and transmits the location information for both items to second controller computer 127. Controller computer 127 scans its database for records associated with the unique identification numbers associated with items I2 and I3. Finding records for each item, controller computer 127 evaluates the location information and determines that both items have moved from zone 105 to zone 104 and updates the record. Next, the controller computer checks the record to determine if the new location for each item constitutes an unauthorized movement designated by the constraints to movement associated with the records at both items I2 and I3. According to the constraints of movement, item I3 is authorized to move throughout environment 122, however, the location of item I2 is restricted to zone 105. Finding an unauthorized movement, controller computer 127 reviews the record for item I2 to finds two courses of action to be taken in response to the unauthorized movement: (1) if item I2 is in zone 104, flash an electronic message on sign 150 located in zone 104 with a predefined message such as "STOP! RETURN LAPTOP COMPUTER"; and (2) print a predefined alert message such as "WARNING LAPTOP COMPUTER OF ZONE 105 HAS BEEN REMOVED AND IS PRESENTLY IN ZONE 104 WITHOUT AUTHORIZATION" on the screen of user terminal 152, a security computer located in zone 104 and connected to node computer 131 through one of its serial ports. To perform these actions, controller computer 127 communicates with node computer 131 through network 140' informing it to activate electronic sign 150 to print the text string warning message sent to it by controller computer 127 and accesses security terminal 152 and print the desired warning message in a window dedicated to system 120 open on the screen of terminal 152. The warning message enables security personnel stationed at terminal 152 to learn of and take appropriate action to stop the unauthorized movement.

Alternatively, system 120 can be programmed to limit the movement of the laptop computer item I2 by selective individuals (items). Under this scenario, the movement of item I2 is not bound by its physical location but rather by the personnel authorized to move item I2 throughout the facility. The record of item I2 would provide constraints to movements that personnel from a particular class, category, or identification number may only move item I2 from zone 105. In this case, item I3 does not possess the requisite authorization to permit movement of item I2 from zone 105. As items I2 and I3 simultaneously pass through frequency fields K and J, receiver 145 receives the unique identification signal from both items and transfers the signals received to node computer 132, which in turn transfers the location information for the items to node computer 127. Node computer 127 updates the records for each item and determines that item I3, a worker, is moving item I2 a laptop computer. The record for item I3 indicates that item I3 does not belong to the class of workers authorized to move item I2.

Finding a violation to constraints to movement of item I2, controller computer 127 reviews the record for item I2 to find two courses of action to be taken in response to the unauthorized movement: (1) if item I2 is in zone 104 and item I2 is moved by personnel not of class X, flash an electronic message on sign 150 located in zone 104 with a predefined message such as "STOP! {name of personnel} RETURN LAPTOP COMPUTER"; and (2) print a predefined alert message such as "WARNING LAPTOP COMPUTER OF ZONE 105 HAS BEEN REMOVED BY {name of personnel} AND IS PRESENTLY IN ZONE 104 WITHOUT AUTHORIZATION" on security computer screen located in zone 104. Controller computer 127 obtains the {name of personnel} from the record for item I3 to insert the information into the text string. Controller computer 127 communicates with node computer 131 through network 140 informing it to activate electronic sign 150 and print a text string warning message sent to it by controller computer 127. If item I3 sees the sign displaying his name he will realize his unauthorized movement of item I2 and return it to zone 105. Further, controller computer 127 communicates to node computer 131 to access user terminal 152 and print the desired warning message in a window dedicated to system 120 open on the screen of terminal 152. The warning message enables security personnel stationed at terminal 152 to identify the individual responsible for the unauthorized movement and take appropriate action to stop the unauthorized movement.

Figure 6:
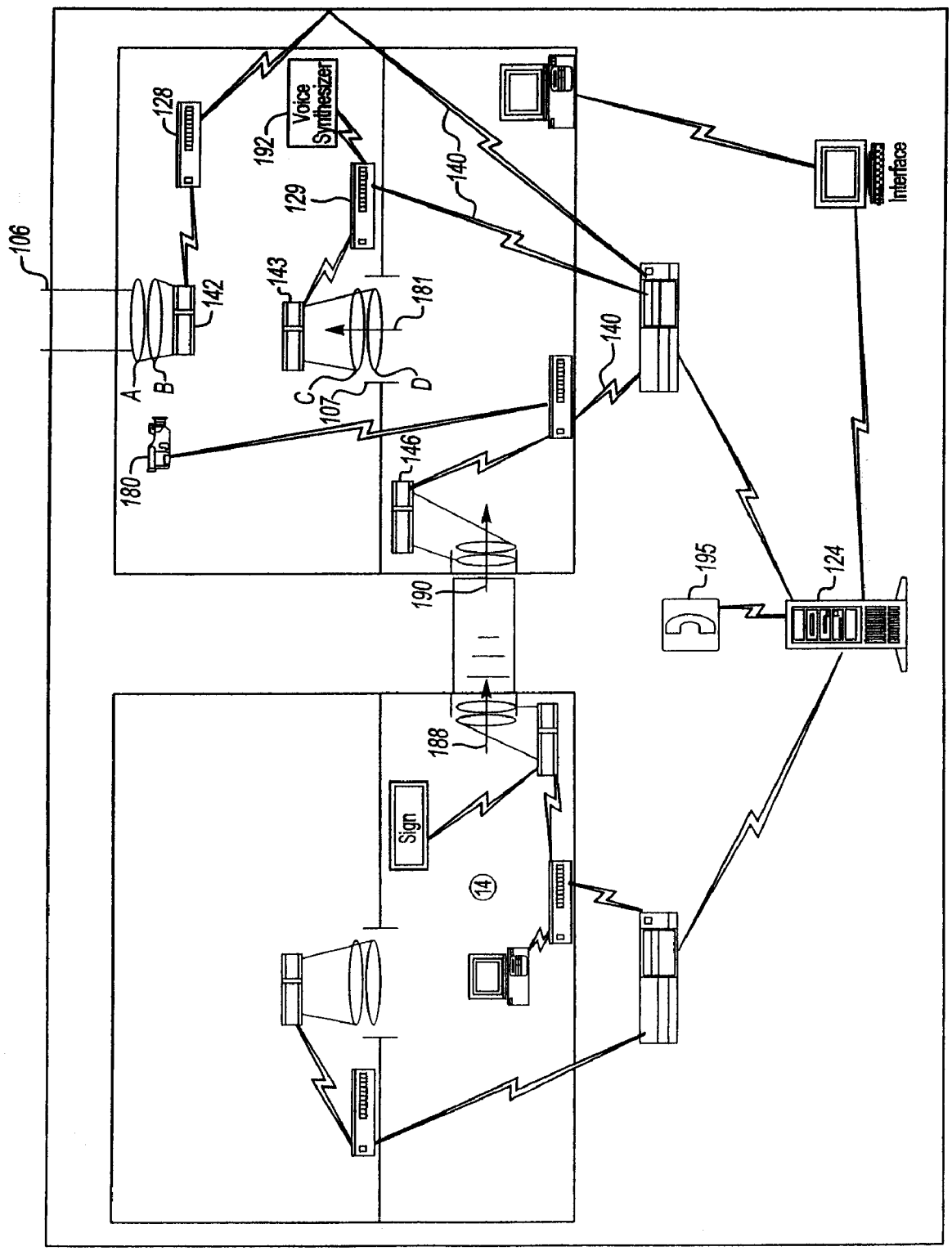
FIG. 6 is a facility layout diagram for an environment employing the present invention.

FIG. 6 also illustrates an application of system 120 used to locate and contact a person in environment 122. Item I4 is a doctor who works in domain 101. During his workday his record is maintained by controller computer 127 because item I4 performs his daily functions entirely in domain 122. At the end of the day, item I4 departs domain 101 through portal 109 leading downstairs to domain 100 as shown by arrow 188. As item I4 passes through frequency fields G and H, receiver 144 receives the unique identification number transmitted from the identification device worn by item I4. Receiver 144 passes the unique identification number and the direction-of-travel signals corresponding to fields G and H, in that order, to node computer 131 that compiles the location information for item I4 and passes the location information to controller computer 127 to update the record for item I4. Controller computer 127 updates the record, evaluates the movement against the constraints of movement for item I4 in its record, and identifies from the location that item I4 has passed from domain 101 and out of the monitoring control of controller computer 127. In this event, controller computer 127 passes the record of Item I4 through network 112 to central server 124, which stores the record in its database until item I4 enters a new domain.

Item I4 exits the stairwell and enters domain 100 passing through frequency fields F and E found in portal 108 as shown by arrow 190. Receiver 146 receives the unique identification number emitted from the identification device worn by item I4 as item I4 passes through frequency fields F and E. Receiver 146 communication the unique identification number to node computer 130 that determines the location information for item I4. Node computer 130 transmits the location information to controller computer 126. Controller computer 126 scans its database for the record corresponding to the unique identification number assigned to item I4. Finding no record, controller computer 126 queries central server 124 through network 112 for the record. Central server 124 locates the record in its database and passes the record for item I4 to controller computer 126, which stores the record in its database updating the record with the location information of item I4.

At the same time, an emergency occurs in domain 101 and the presence of item I4 is immediately required. A nurse working at terminal 152, accesses a locate command from a window running system software for system 120. From this window, the nurse types in the name of item I4. Node computer 131 receives this input and immediately relays it to controller computer 127 attempts to locate a record associated with the name. Unable to locate a record associated with the name, controller computer 127 passes the information to central server 124. Central server 124 sends the name to all controller computers in environment 122 requesting the location of item I4. Controller computer 126 receives the information and finds that it corresponds to the record assigned to item I4 in its database. Controller computer 126 passes location information on item I4 to central server 124, which in turn generates a message for display in the window operating on terminal 152 and passes the message through controller computer 127 and node computer 131 to terminal 152.

The nurse at terminal 152 seeing that item I4 is in domain 100 and likely going to depart from environment 122 shortly, selects a command from the window on terminal 152 to alert item I4 that his assistance is needed immediately in domain 101. In this window, the nurse elects to both page the doctor and alert the doctor to the emergency through a peripheral warning device prior to leaving environment 122. In the window operating on terminal 152, the nurse types a paging number with an emergency code to be sent to the pager worn by item I4. Terminal 152 transmits the paging message through node computer 131, relayed to controller computer 127, which passes it onto central server 124. Central server 124 connects with an in-house third party communication system that incorporates paging system 195 and activates the paging system 195 ordering a page to pager worn by item I4.

Simultaneously, item I4 continues to move through domain 100. Item I4 enters point-of way 107 and passes through frequency fields D and C, in that order, as shown by arrow 191. This movement is identified by receiver 143, which picks-up the unique identification transmission from the identification device associated with item I4. Receiver 143 passes the information to node computer 129, which in turn, passes the new location information to controller computer 126. Controller computer 126 updates the record associated with item I4 and passes new location information to central server 124 to update the location of item I4 in the window for user terminal 152.

Meanwhile, the nurse at terminal 152 elects to alert item I4 of the emergency directly through a voice synthesizer known to be installed in zone 102 for this purpose. In the window on terminal 152, the nurse types a text message to be communicated. This text message is sent through node computer 131 to controller computer 127 to central server 124, which routes the message to controller computer 126. Controller computer 126 maintains software to convert the text-based message to a signal interpretable by voice synthesizer 192. Controller computer 127 sends the signal to node computer 129 that interfaces with voice synthesizer 192. Voice synthesizer 192 projects an audio message into zone 102 directed to item I4. At about the same time, item I4 also received the page sent by third party pager system 190. Hearing the audio message from synthesizer 192 and receiving the page, item I4 responds by returning to domain 101 with system 120 continuously tracking his movements and locations in the same manner as previously discussed.

Figure 7:
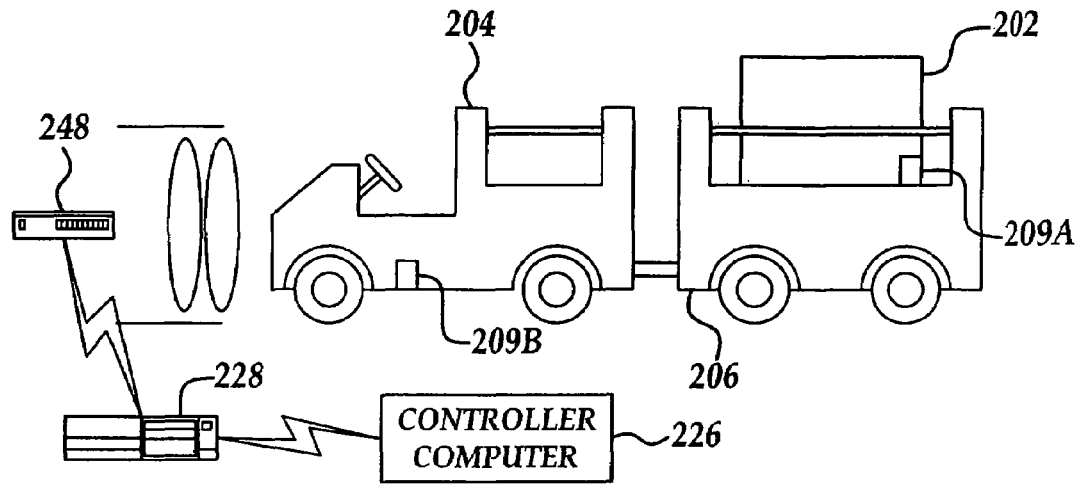
FIG. 7 is a diagrammatic illustration of a vehicle and trailer with a container.
Figure 8:
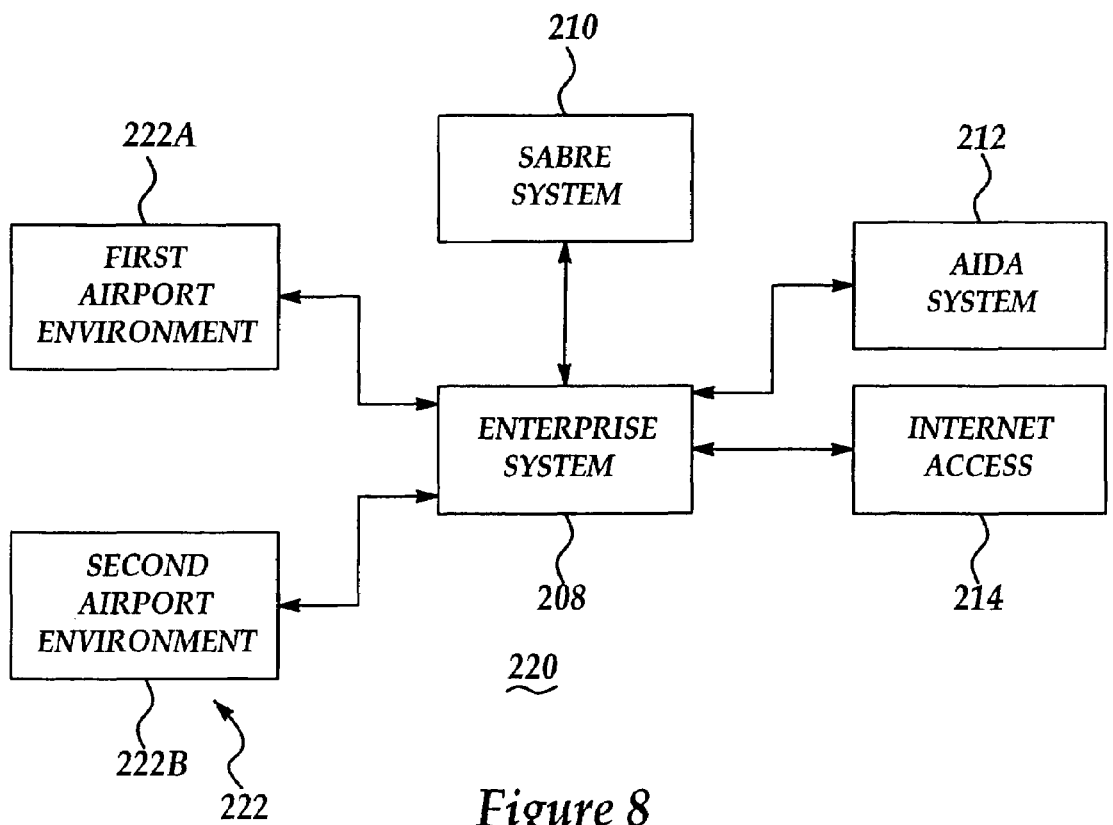
FIG. 8 is a block diagram of an example of an area-directional tracking and event-driven information system applied to a transportation or shipping environment, such as an airport, according to an embodiment of the present invention.
Figure 9:
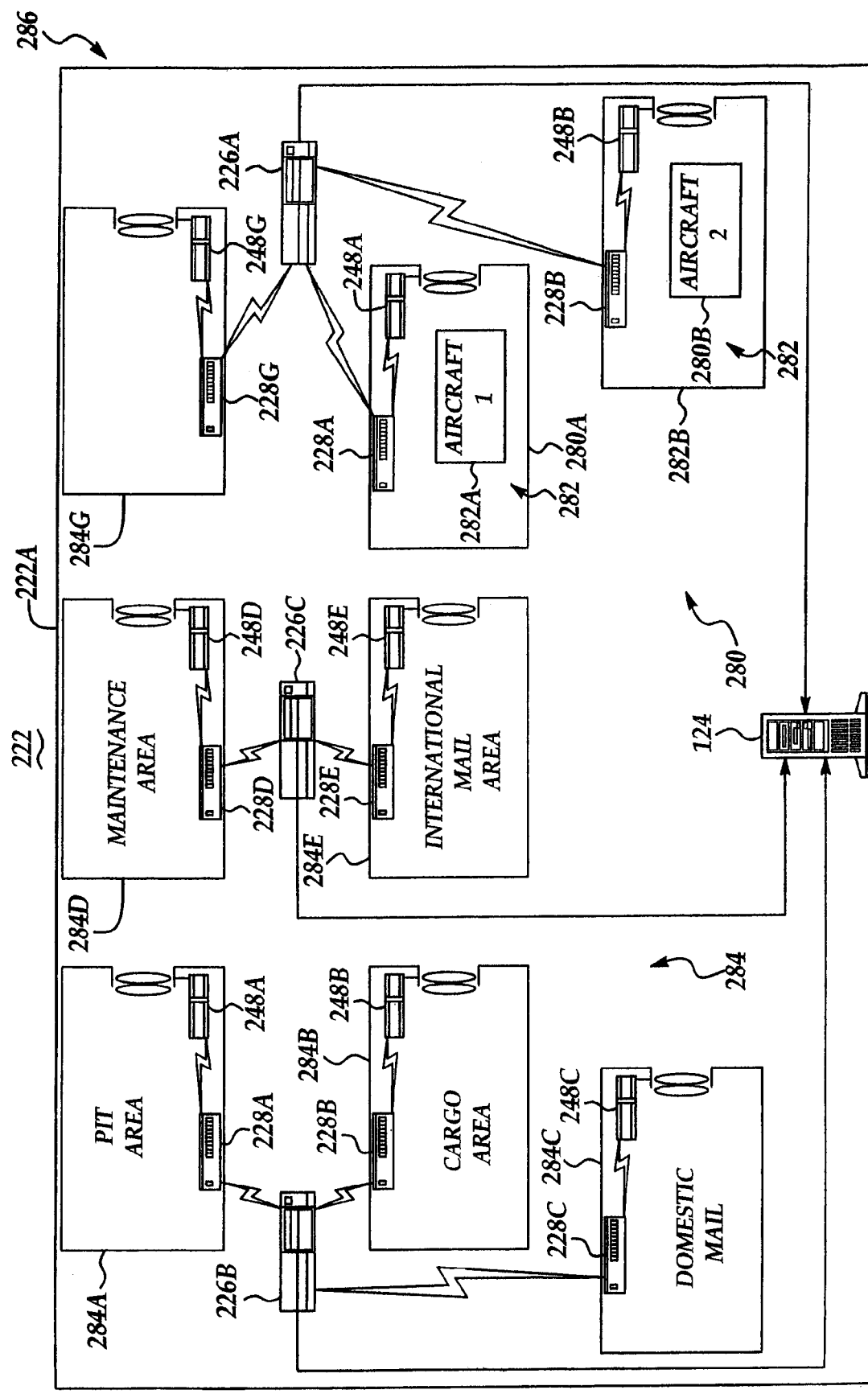
FIG. 9 is a diagrammatic illustration of the system of FIG. 8.

With reference to FIGS. 7–9, another exemplary embodiment of the present invention is illustrated. In the present embodiment, a system 220 monitors and tracks a container 202 in an environment 222. In one embodiment, the environment 222 is a transportation or shipping environment, such as an airport, truckyard, or railyard. In the following discussion, the environment 222 will be described as an airport. However, the present invention is not limited to a specific type of environment.

With specific reference to FIG. 7, the container 202 may be used to deliver, ship, or move any number of types of cargo or equipment within or into or out of an airport. A vehicle 204 and a trailer 206 may be used to move the container 202. Other types of vehicles, for example, a forklift truck or other material handling machines or transport vehicle may also be used. One or more transmitters 209 may be used to track the container 202, the vehicle 204, or the trailer 206 within, into or out of an airport. As shown in FIG. 7, in the exemplary embodiment shown, a first transmitter 209A is coupled to the container 202 and a second transmitter 209B is coupled to the vehicle 204.

With specific reference to FIG. 8, the system 220 includes an enterprise system 208 which is used to track the container 202 throughout the airport environment 222. The airport environment 222 may be divided into domains and zones (see above). For example, the airport environment 222 may include more than one airport. In the illustrated embodiment, the airport environment 222 includes first and second airports 222A, 222B. The system 220 tracks the container 202 throughout the airport environment 222, including into and out of each airport 222A, 222B. Information regarding the movement of the container 202 is sent to and stored within the enterprise system 208. Information may be shared with external systems, such as a SABRE system 210 and/or an AIDA system 212. Access to the enterprise system 208 may also be provided externally, such as through the Internet 214.

Each transmitter 209A is assigned a unique identification number and is adapted to transmit the unique identification number (see above). The system 220 includes at least one receiver 248 which is adapted to receive the unique identification number from the transmitters 209, to responsively determine a direction of travel of the transmitter 209, and to responsively generate a direction of travel code (see above). As shown in the embodiment of FIG. 7, the transmitter 209A coupled to the container 202 is assigned a first unique identification number and the transmitter 209B coupled to the vehicle is assigned a second unique identification number.

The system 220 also includes at least one node computer 228 coupled to the receiver 248 and being adapted to control the receiver 248, to receive the unique identification number and the direction of travel code from the receiver, and to responsively determine a location of the container 202 or the vehicle 204 as a function of the direction of travel code.

In one embodiment, the system 220 also includes a controller computer or node server 226 coupled to the node computer 228 and being adapted to receive the first and second unique identification numbers, the location of the container 202, and the location of the vehicle 204 from the node computer 228 and to compare the locations of the container 202 and the vehicle 204 to at least one predefined constraint of movement of the container 202 and activating at least one warning device if the at least one predefined constraint of movement is violated. For example, the vehicle 204 may not have permission or authority to move the container from one location to another location.

With reference to FIG. 9, a more detailed view of an exemplary airport environment 222 is shown. As discussed above, the airport environment 222 may include a plurality of airports. For simplicity, only a single airport 222A is shown in FIG. 9, however, the airport environment 222 may include additional airports.

The airport 224 may include a loading zone 280 for at least one aircraft 282. In the illustrated embodiment, first and second loading zones 280A, 280B are shown for first and second aircraft 282A, 282B, respectively. Each loading zone 280A, 280B includes a portal and a receiver 248A, 248B located at the respective portal. In the illustrated embodiment, the receivers 248A, 248B are coupled to first sand second node computers 228A, 228B. The first and second node computer 228A, 228B are coupled to a first controlling computer 226A.

The airport 222 may also include at least one container area 284. In the illustrated embodiment, the airport 222 includes a pit area 284A, a cargo area 284B, a domestic mail area 284C, a maintenance area 284D, and an international mail area 284E. The container areas 284 are used for storage, loading/unloading, and maintenance, as needed. It should be noted that this arrangement of container areas is for illustrative purposes only and the present invention is not limited to any such arrangement.

Each container area 284 includes a portal and third, fourth, fifth, sixth and seventh receivers 248C, 248D, 248E, 248F, 248G located at the respective portal. Each receiver 248C, 248D, 248E, 248F, 248G is coupled to third, fourth, fifth, sixth and seventh node computers 228C, 228D, 228E, 228F, 228G, respectively. In the illustrated embodiment, the third, fourth, and fifth node computers are coupled to a second controlling computer 226B and the sixth and seventh node computers are coupled to a third controlling computer 226G.

In the illustrated embodiment, the airport environment 222 includes at least one ingress/egress area 284G, adjacent a road or highway or 286H or the like. The ingress/egress area 286 including a portal and an eighth receiver 248H located at the portal. The eighth receiver 248H is coupled to an eighth node computer 228H. The eighth node computer 228H is coupled to the first controlling computer 226A.

As shown, the controlling computers 226A, 226B, 226C are coupled to the central server 124 (see above).

As stated above, the system 220 is programmed with a set of predefined rules or constraints against the movement of the containers and/or vehicles within the airport environment 222 and the real-time or near real-time reporting of movement of the containers from specific area to specific area or from specific area to unknown areas, from areas inside the airport to areas outside the airport, from the terminal to specific flights or any other tracking requirements, as needed. As described above, the system 220 may also include one or more cameras for recording events related to the movement of containers and/or vehicles. The system 220 may also include one or more signs or other signaling devices for relaying messages related to the containers and/or vehicles throughout the airport environment.

Examples of logged or reported events may include:

When a container enters or departs from the terminal (cargo) property. The system 220 may also record which airline vehicle was being utilized to facilitate the movement of the container.

When a container was placed onto or taken off of an aircraft. After the container was loaded into the cargo hold of an aircraft, the transmitting device may shut down and cease transmitting until the container is off loaded.

When the container passes through specified entrance/exit or control points. Such points might include areas like the "pit" where a specific egress road would be covered, the access point to a domestic mail facility and the access point to the staging area near an international terminal.

The current location of any or all vehicles and a historical log of their movement.

Other advantages and features of the present invention may be understood from a study of the drawings and appended claims.

The invention claimed is:

1. A system for monitoring and tracking an item in an environment, the item having a transmitter assigned a unique identification number, the transmitter being adapted to transmit the unique identification number, comprising:
    a receiver for receiving the unique identification number and responsively generating a direction of travel code of the item as a function of the unique identification number;
    a node computer coupled to the receiver for receiving the unique identification number and the direction of travel code from the receiver, and responsively determining a location of the item as a function of the direction of travel code and the unique identification number.

2. A system as set forth in claim 1, further comprising a controller computer coupled to the node computer and being adapted to receive the unique identification number and the location of the item from the node computer and to store the unique identification number and the location of the item.

3. A system as set forth in claim 2, further comprising a central computer facility coupled to the controller computer and being adapted to collect and store the unique identification number and the location of the item for exportation from the system.

4. A system, as set forth in claim 1, wherein the receiver includes a first antenna and second antenna, wherein the first antenna and the second antenna are placed at a portal in the environment and correspond to the direction of travel.

5. A system, as set forth in claim 4, further comprising a controller computer for comparing location of the item to at least one predefined constraint to movement of the item stored in the controller computer to determine at least one violation in movement of the item and activating at least one warning device connected to the node computer, controller computer or a central computer facility if the at least one predefined constraint of movement is violated.

6. A system, as set forth in claim 5, wherein the warning device is selected from the group consisting of the following:
    (a) a user terminal or work station;
    (b) an electronic sign;
    (c) a voice synthesizer;
    (d) a speaker;
    (e) a monitor;
    (f) a video or digital camera; or
    (g) a pager system.

7. A system, as set forth in claim 5, wherein the central computer facility links with at least one third party communication system to respond to the violation of movement of the item.

8. A system, as set forth in claim 7, wherein the third party communication system is selected from the group consisting of the following:
    (a) a computer network;
    (b) a telecommunication network; or
    (c) a pager network.

9. A system, as set forth in claim 1, further comprising a controller computer, wherein a record maintained by the controller computer stores the unique identification number and location of the item and the record being transferable to a central computer facility.

10. A method, for monitoring and tracking at least one item in an environment, including the steps of:
    dividing the environment into a plurality of domains with at least one portal separating the domains;
    providing the item with a unique identification number;
    developing an electronic record for the identification number and recording a first location for the item;
    attaching a transmitter emitting the unique identification number to the item;
    providing a receiver at the portal;
    moving the item through the portal;
    receiving the unique identification number by the receiver when the transmitter passes through the portal and responsively determining a direction of travel of the item and generating a direction of travel code;
    sending the identification number and the direction of travel code from the receiver; and
    determining a second location of the item as a function of the direction of travel code and the first location of the item.

11. A method as set forth in claim 10, including the step of storing the second location of the item in the electronic record of the item.

12. A method, as set forth in claim 10, further comprising:
defining at least one constraint to movement of the item in the record of the item;
comparing the second location of the item to the constraint to movement of the item to determine at least one violation in movement of the item; and
activating a warning device to respond to the violation in movement of the item.

13. A method, as set forth in claim 12, wherein the warning device is selected from the group consisting of the following:

(h) a user terminal or work station;
(a) an electronic sign;
(b) a voice synthesizer;
(c) a speaker;
(d) a monitor;
(e) a video or digital camera; or
(f) a pager system.

* * * * *